(12) United States Patent
Hulin

(10) Patent No.: US 9,193,459 B2
(45) Date of Patent: Nov. 24, 2015

(54) UNLOADING AND LOADING OF AIRCRAFT

(75) Inventor: Martyn Hulin, Bristol (GB)

(73) Assignee: Airbus Operations Limited, Bristol (GB)

( * ) Notice: Subject to any disclaimer, the term of this patent is extended or adjusted under 35 U.S.C. 154(b) by 2352 days.

(21) Appl. No.: 12/081,455

(22) Filed: Apr. 16, 2008

(65) Prior Publication Data

US 2008/0290220 A1  Nov. 27, 2008

(30) Foreign Application Priority Data

May 24, 2007 (GB) .................................. 0709969.0

(51) Int. Cl.
  *B64D 9/00* (2006.01)
  *B64F 1/32* (2006.01)

(52) U.S. Cl.
  CPC .... *B64D 9/00* (2013.01); *B64F 1/32* (2013.01)

(58) Field of Classification Search
  USPC ............. 244/137.1, 137.2, 118.1; 14/2.4–2.6
  See application file for complete search history.

(56) References Cited

U.S. PATENT DOCUMENTS

| | | | | |
|---|---|---|---|---|
| 1,687,354 A * | 10/1928 | Systrom | .......................... | 14/69.5 |
| 2,808,257 A * | 10/1957 | Brookbank | ...................... | 49/109 |
| 3,722,017 A * | 3/1973 | Gacs et al. | ...................... | 14/71.5 |
| 3,735,885 A * | 5/1973 | Comfort | ........................ | 414/503 |
| 3,808,626 A * | 5/1974 | Magill | ........................... | 14/71.5 |
| 3,854,610 A | 12/1974 | Carder | | |
| 3,964,118 A * | 6/1976 | Meyers et al. | ................. | 14/72.5 |
| 4,014,486 A * | 3/1977 | Nelson et al. | .............. | 244/129.6 |
| 4,018,321 A * | 4/1977 | Fisher | ......................... | 193/25 B |
| 5,490,703 A * | 2/1996 | Hewko | ............................ | 296/19 |
| 6,698,545 B2 * | 3/2004 | Baker et al. | ..................... | 182/48 |
| 7,828,248 B2 * | 11/2010 | Gonzalez Linero | ....... | 244/137.2 |
| 7,984,876 B2 * | 7/2011 | Gonzalez Linero | ....... | 244/129.6 |
| 2003/0062451 A1* | 4/2003 | Sankrithi | ................... | 244/137.1 |

FOREIGN PATENT DOCUMENTS

WO    WO 2006/117003 A1    11/2006

OTHER PUBLICATIONS

Great Britain Search Report for GB 0709969.0 dated Sep. 21, 2007.

* cited by examiner

*Primary Examiner* — Tien Dinh
(74) *Attorney, Agent, or Firm* — Nixon & Vanderhye P.C.

(57) ABSTRACT

An access platform (208) enables containers (222) to be loaded into a cargo hold (218) of an aircraft (202) from a ground vehicle (220). The platform (208) has two opposite and non-parallel ends (210, 214), between which there is defined a support surface, the platform when viewed in plan having a generally trapezoidal shape. In use, an item (222) of cargo is moved between the cargo hold (218) and the ground vehicle (220) via a door opening, the movement of the item (222) through the door opening being in a direction (213) which when viewed in plan is not parallel to the direction (211) in which the door opening faces. During such movement, the item (222) of cargo is supported by from beneath by the support surface of the platform (208).

16 Claims, 7 Drawing Sheets

UNLOADING AND LOADING OF AIRCRAFT

This application claims priority to GB 0709969.0 filed 24 May 2007, the entire contents of which is hereby incorporated by reference.

BACKGROUND OF THE INVENTION

The present invention relates to the loading and unloading of aircraft, for example loading freight onto, and unloading freight from, the cargo hold of an aircraft.

Aircraft are typically able to carry freight in a cargo hold. Items of freight may include containerised items of cargo, for example in the form of containers, and/or may include pallets on which one or more objects are arranged. While there exist common types of container and pallet types for certain aircraft hold dimensions, such containers and pallets typically have a shape and size that depends on the available space in the aircraft cargo hold. They therefore tend to have a size and shape that depends on the model of aircraft with which they are used. For example, the containers used for a given aircraft are of the same dimensions and typically have a shape and size that makes good use of the internal space available within the cargo hold. Pallets or containers may therefore have a width just less than the internal width available in the cargo hold, there being room for one pallet/container across the width of the aircraft fuselage. In larger aircraft, the containers/pallets may be designed to sit two abreast along the length of the cargo hold. For narrow bodied aircraft it is common for the standard items of cargo to be designed to be loaded into the cargo hold with one pallet/container extending across substantially the entire width of the fuselage interior. Items of cargo, such as pallets and containers, typically have a width of less than three and a half meters, but greater than one and a half meters. The internal volume provided by each container may be between 3 and 5 cubic meters. The mass of a pallet or a container when loaded may be of the order of 1 to 2 tonnes or greater, and is certainly typically greater than 100 Kg. The use of such pallets/containers facilitates efficient loading and unloading of aircraft. Cargo holds may be equipped to carry such items of cargo.

The cargo hold of an aircraft is typically accessible via one or more cargo doors. In certain aircraft, for example smaller single-aisle commercial passenger aircraft, one of the cargo doors may, because of design constraints for example, be positioned at a location near to the aircraft's engine, the wing fairing, the horizontal tail-plane, or other aircraft structure that might prevent a conventional pallet/container loader from loading pallets/containers into one or all of the cargo holds. Usually, there will be another cargo door providing access to the bulk cargo hold. Such aircraft however can suffer from access problems, in that standard pallet/container loaders are unable to load pallets/containers into one or all of the cargo holds via all doors. This can result in only one cargo door being available for loading pallets/containers while the other door is used to load smaller items of cargo into the bulk cargo hold with smaller ground handling equipment. These limitations in the efficient use of all cargo doors may result in lengthened turnaround times and therefore direct increased cost to the airline.

The present invention seeks to mitigate the above-mentioned problems. Alternatively or additionally, the present invention seeks to improve the efficacy of loading and unloading of aircraft with freight containerised in pallets/containers. Alternatively or additionally, the present invention seeks to improve the loading and unloading of aircraft which have limited or restricted ground-handling-vehicle accessibility, which may result from the limited length of the aircraft or from the arrangement of cargo doors relative to potential obstructions.

SUMMARY OF THE INVENTION

In accordance one aspect of the present invention there is provided an access platform for an aircraft, wherein the access platform comprises a first end, a second end opposite the first end, and a support surface that extends between the first end and the second end, and the first and second ends of the platform when viewed in plan are non-parallel.

In accordance another aspect of the present invention there is provided an access platform for an aircraft cargo hold door opening, wherein the access platform is adapted to enable an item of cargo to be loaded onto the aircraft so that the movement of the item through the door opening is in a direction which when viewed in plan is not parallel to the direction in which the door opening faces. Thus, an access platform according to an embodiment of the present invention may improve access to the cargo hold of an aircraft by a ground vehicle by means of enabling items of cargo to be unloaded/loaded in a direction which when viewed in plan extends from the aircraft away from an aircraft structure which might otherwise restrict access to the cargo hold door opening.

The platform may include an attachment mechanism for attaching the platform to a vehicle and the attachment mechanism is configured relative to the platform so that the platform when in use extends from the aircraft in a direction which when viewed in plan is not parallel to the direction in which the door opening faces. Alternatively, or additionally, the platform may be so shaped that the platform when in use extends from the aircraft in a direction which when viewed in plan is not parallel to the direction in which the door opening faces. For example, the access platform may comprise a first end, a second end opposite the first end, and a support surface that extends between the first end and the second end, and the first and second ends of the platform when viewed in plan are non-parallel.

Thus, the access platform according to certain embodiments of the present invention can be used to bridge the gap between an aircraft door opening and an aircraft cargo loading ground vehicle, such as a pallet/container loader, that is arranged to load cargo onto the aircraft at an angle to the perpendicular from the longitudinal axis of the aircraft. In such a case, the length of the pallet/container loader will be inclined relative to the direction in which the cargo door opening faces, so that the pallet/container loader is not "square on". In such an orientation, the rear parts of the pallet/container loader may be positioned to be sufficiently clear from obstacles, such as the aircraft engines, that would otherwise be too close for safe unloading/loading of the aircraft. The clearance between the ground vehicle and such protrusions/obstacles may be increased by means of an access platform, which allows the vehicle to load the freight at an angle (when viewed in plan) rather than having to load freight in a direction perpendicular to the cargo door opening. Thus, an access platform according to an embodiment of the present invention may improve access to the cargo hold of an aircraft by a ground vehicle by means of acting as a bridging platform to fill the gap that would otherwise exist if the ground vehicle loaded cargo onto the aircraft at a non-zero angle to the conventional (square on) position in which cargo is typically loaded.

In view of the feature of certain embodiments of the present invention that the first and second ends of the platform when viewed in plan are non parallel, there is a non-zero angle defined between (i) the direction in which the first end extends and (ii) the direction in which the second end extends, when such directions are resolved in the plane of the platform. This non-zero angle is preferably greater than 5 degrees and may be greater than 10 degrees. In embodiments of the invention the angle may be of the order of 15 degrees for example. The first and second ends of the platform are preferably substantially straight when viewed in plan but may include curved portions.

The access platform may be adapted so that it can be attached to a vehicle such as an aircraft or a cargo loading vehicle. The platform may be attached to such a vehicle by means of an attachment mechanism. Such an attachment mechanism may enable the platform to be moved between various positions. For example, the platform may be arranged to be moved between a deployed position in which it acts as an access platform, and a stowed position. The platform may be arranged for translational movement. The translational movement may be in a direction parallel to the plane of the platform. For example, the platform may be arranged to extend out from an aircraft in a substantially horizontal direction, while the platform is substantially horizontal. The platform may alternatively or additionally be arranged for rotational movement, for example about a substantially horizontal axis and/or an axis that generally lies within the plane of the platform. The attachment mechanism may form part of the vehicle. The attachment mechanism may form part of the platform.

The platform typically has a width large enough to support a pallet or container of a given length. For example, the platform may be at least 1 meter wide and may be wider than 1.4 meters. The length of the platform, when deployed, may at its longest be shorter than the width of the platform. The length of the platform, at its longest, may be less than 1.5 meters and may be less than 1 meter. The platform may be so shaped and configured that when in a position allowing transfer of cargo between a ground vehicle and an aircraft, the greatest separation (resolved in the direction in which the containers are moved through the door opening) between the base of the door opening and the end of the platform outside the aircraft is less than 1.5 meters (and possibly less than 1 meter). The platform when deployed is preferably able to withstand a downward load of over 500 Kg and may be able to support a mass of greater than 1 tonne.

In the case where the platform is associated with an aircraft, there may be defined (i) a first angle between the longitudinal axis of the aircraft and the direction in which the first end of the platform extends, and (ii) a second angle between the longitudinal axis and the direction in which the second end of the platform extends (the angles being measured when the access platform is deployed and the aircraft is viewed in plan). The first and second angles may each be ≥zero degrees. Alternatively, the first and second angles may each be ≤zero degrees. In each of the exemplary embodiments described with reference to the accompanying drawings, the magnitude of the second angle is greater than the first angle. For example, the first angle may be 0 degrees and the second angle may be 5 degrees. The first angle may be 5 degrees and the second angle may be 15 degrees. The first angle may be −5 degrees and the second angle may be −20 degrees. The difference between the first and second angles is preferably greater than 10 degrees.

The present invention also provides an aircraft including a platform of the present invention. According to one aspect of the invention there is provided an aircraft including a door opening for the conveying of cargo to or from the aircraft and an access platform, the door opening being proximate to an aircraft structure that restricts access to the opening, wherein the access platform is so configured to allow an aircraft cargo loading ground vehicle to supply an item of cargo to the aircraft via the platform whilst the ground vehicle is positioned, when viewed in plan, at a non-zero angle to the direction in which the door opening faces and away from the aircraft structure, thereby improving safe access to the cargo hold.

Mounting the platform on an aircraft may be of benefit in that airport ground vehicles may be used in relation to the aircraft in an angled manner in accordance with the present invention, and without requiring the airports to modify the cargo handling equipment conventionally used. The invention has particular, but not exclusive, benefit in relation to narrow bodied aircraft. The aircraft may for example have a fuselage diameter of less than 5 meters (or even less than 3.5 meters). The present invention may be of greater application to aircraft of a particular size, for example an aircraft large enough to make efficient loading and unloading of containerised cargo important, but small enough that the space around the aircraft available for loading and unloading of the aircraft may be limited. The aircraft may for example have a dry weight of greater than 20 tonnes. The aircraft may have a dry weight of less than 200 tonnes. The aircraft may have a length of greater than 20 meters. The aircraft may have a length of greater than 40 meters. The aircraft may have a length of less than 60 meters. The aircraft may be of a size equivalent to an aircraft designed to carry more than 75 passengers. The aircraft may be of a size equivalent to an aircraft designed to fewer than 300 passengers. It will of course be appreciated that embodiments of the present invention may have benefit on an aircraft of any shape and size, where limited ground-handling accessibility can be a problem or present an increased risk of clashes between loading equipment and the aircraft structure. Such access problems can for example arise in relation to the design of short and stubby aircraft as well as long and slender aircraft. For example, unconventional positioning of wings and engines on the aircraft can cause access problems.

The platform when in its deployed position may be positioned at a door opening in the vicinity of an obstacle on the outside of the aircraft, the obstacle hindering access to the door opening. The obstacle may be in the form of a part of the aircraft structure, in particular the wing of the aircraft, an engine, wing flap track fairing or other protrusion. The separation as measured along the longitudinal axis between the platform and the obstacle may for example be less than 2 meters and in certain embodiments may be less than 1 meter, or even less than 600 mm. The present invention yet further provides an aircraft including a door opening for the conveying of passengers or cargo to or from the aircraft and an access platform, wherein the access platform comprises a first end, a second end opposite the first end, and a support surface that extends between the first end and the second end, and wherein the first end is attached to the aircraft in the region of the door opening. The platform may be adapted to enable an aircraft-cargo-loading ground vehicle to move cargo between the aircraft and the vehicle via the platform with cargo moving across the platform in a direction that is non-parallel to the horizontal axis that is perpendicular to the longitudinal axis of the aircraft. For example, the second end of the platform when viewed in plan may be non parallel to the door opening. It will of course be appreciated that the position of the first and second ends of the platform relative to the aircraft may move. For example, the access platform may be movable between a stowed position and a deployed position.

The present invention also provides an aircraft cargo ground vehicle including a platform according to the present invention. Mounting the platform on the aircraft cargo ground vehicle may be of benefit in that an aircraft may be loaded/unloaded by the ground vehicle in an angled manner in accordance with the present invention, and without increasing the mass of the aircraft. The aircraft cargo loading ground vehicle may, for example, be in the form of a pallet/container loader. The present invention yet further provides an aircraft cargo-loading-ground vehicle including an access platform, wherein the access platform comprises of first end, a second end opposite the first end, and a support surface that extends between the first end and the second end, and wherein the second end of the access platform is attached to the vehicle and the first end of the access platform is adapted for association with (for example engagement with) a door opening of an aircraft to facilitate the loading of cargo onto the aircraft. The platform may be adapted to enable the aircraft-cargo-loading ground vehicle to move cargo between an aircraft and the vehicle via the platform with cargo moving across the platform in a direction that is non-parallel to the horizontal axis that is perpendicular to the longitudinal axis of the aircraft. For example, the first end when viewed in plan may be non-parallel to the notional horizontal line that is perpendicular to the direction in which the vehicle is arranged to move cargo from the vehicle onto the aircraft.

The present invention also provides a method of moving cargo between the cargo hold of an aircraft and an aircraft-cargo-loading ground vehicle, wherein the method includes a step of using an access platform according to the present invention to support the cargo as is passes between the cargo hold and the aircraft-cargo-loading ground vehicle.

The present invention yet further provides a method of moving cargo between the cargo hold of an aircraft and an aircraft-cargo-loading ground vehicle, wherein the method comprises the following steps:

providing an aircraft having a cargo hold accessible via a door opening, providing an aircraft-cargo-loading ground vehicle, moving an item of cargo between the cargo hold and the ground vehicle via the door opening, the movement of the item through the door opening being in a direction which when viewed in plan is not parallel to the direction in which the door opening faces, and supporting the item of cargo from beneath during the journey of the cargo between the cargo hold and the ground vehicle.

The method of the present invention may be of particular benefit when performed in relation to moving large items of cargo. An item of cargo may be considered as being large if it is larger or more massive than an item that is able to be manually handled. An item of cargo may be considered as being large if it is in the form of a container having an internal volume of greater than 2 cubic meters. The footprint of the item of cargo when viewed in plan may, by virtue of the way in which the platform is adapted, during its movement through the door opening pass outside the region defined between two notional lines extending outwardly, from the left and right extreme sides of the door opening, in the direction in which the door opening faces.

The method may be performed to load an item of cargo from the ground vehicle onto the aircraft. The method may be performed to unload an item of cargo from the cargo hold onto a ground vehicle. The step of moving an item of cargo through the door opening may be performed such that the direction of movement when viewed in plan is at an angle of more than 5 degrees to the direction to which the door opening faces. Preferably, the angle is greater than 10 degrees.

The item of cargo may be supported from beneath during the entire journey of the item of cargo between the ground vehicle and the aircraft. A platform may be provided to support the item of cargo during at least part of its journey between the ground vehicle and the aircraft. The platform may be in form of an access platform in accordance with any aspect of the present invention described herein. The platform need not support the entire weight of the item of cargo at any instant during performance of the method, as the weight of the item may partially be supported by another part of at least one of the aircraft and the ground vehicle. The method may include a step of moving the platform from a stowed position to a deployed position, in which it is able to support items of cargo as they pass between the ground vehicle and the aircraft. The step of moving the platform may include extending the platform, for example by translating the platform in a direction parallel to the surface of the platform that supports the items of cargo. The step of moving the platform may include a step of deploying the platform by rotating it about an axis. For example the platform may rotate from a substantially upright position (or a position that is more vertical than horizontal) to a horizontal position. The method may include a step of causing the platform to engage with at least one of the aircraft and the aircraft-cargo-loading ground vehicle. Once the platform is so engaged, it may then be mechanically connected to both of the aircraft and the aircraft cargo loading ground vehicle.

The item of cargo may have a mass greater than 100 Kg. The item of cargo may have a mass of greater than 500 Kg. The item of cargo may have a length greater than 1 meter. It will be understood that the length of the item of cargo is the dimension that when loaded in the cargo hold lies along the longitudinal axis of the aircraft. Therefore, the length of an item of cargo may be shorter than its width. The step of moving an item of cargo through the door opening may be performed by moving the item of cargo through the opening in a direction parallel to the width of the item. In such a case, the width of the door opening must necessarily be longer than the length of the item of cargo. In certain embodiments of the present invention, the door opening has a width greater than the sum of a) the length of the item of cargo divided by the cosine of the angle (when viewed in plan) between the direction of the movement of the item of cargo through the door opening and the direction in which the door opening faces and b) an extra distance necessary for tolerances and ease of manoeuvrability of items through the door. The extra distance will typically be greater than 100 mm and may be greater than 200 mm. In certain embodiments of the invention the extra distance will be about 250 mm or greater.

The method may include a step of imparting rotational movement of the item of cargo about a vertical axis, for example when at least a part of the item is in the cargo hold. Such a step may be performed before or after a step of moving the item longitudinally along the length of the aircraft within the cargo hold.

It will of course be appreciated that features described in relation to one aspect of the present invention may be incorporated into other aspects of the present invention. For example, the method of the invention may incorporate any of the features described with reference to the platform of the invention and vice versa. Also, the present invention provides a platform adapted for use in the method of the present invention. The invention also provides an aircraft incorporating a platform, the aircraft and platform together being adapted for use in performing the method of the invention. Furthermore, there is also provided an aircraft-cargo-loading ground vehicle and platform, which together are adapted for use in performing the method of the invention. It will be appreciated that the platform, aircraft and/or the aircraft-cargo-loading ground vehicle mentioned immediately above may incorporate features of the platform, aircraft and/or the aircraft cargo loading ground vehicle as described herein with reference to other aspects of the present invention. Thus, the platform may, but need not necessarily, have first and second ends, which when viewed in plan are non parallel.

DESCRIPTION OF THE DRAWINGS

Embodiments of the present invention will now be described by way of example only with reference to the accompanying Figures of which.

DETAILED DESCRIPTION

Figure 1:
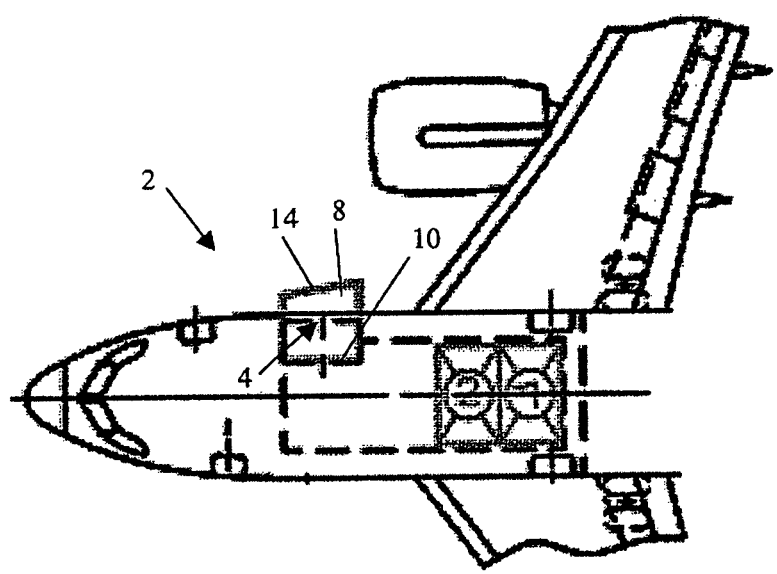
FIG. 1 is a partial cross-section of an aircraft shown in plan, the aircraft including a platform in a deployed position according to a first embodiment of the invention.

FIG. 1 shows part of an aircraft in plan view as a cross-section. The aircraft 2 is a narrow bodied aircraft having freight carrying capacity in its lower hold. The diameter of the fuselage of the aircraft 2 is about 4.5 meters. The aircraft in this embodiment has a relatively low wing.

Freight, for example, in the form of pallets or containers are loaded into the aircraft lower cargo hold (or unloaded from the aircraft) via an opening 4 having an associated door (not shown in FIG. 1). Also associated with the opening 4 is a platform 8 for supporting cargo as it is loaded onto or off the aircraft 2.

The platform 8 has a first end 10 that is hinged to the aircraft door opening 4 via hinges (not shown). This first end 10 lies on a generally straight line when viewed from above. Opposite the first end 10 of the platform is a second end 14. Again, the second end 14 lies on a generally straight line when viewed from above. (It will of course be appreciated that the first and second ends 10, 14, whilst shown as having straight edges in the figures, may be curved edges). The line along which the first end 10 lies is generally aligned with the outer line of the fuselage of the aircraft 2 in the region of the door opening 4 (when viewed from above). The platform 8 shown in FIG. 1 has two generally parallel sides that join the first and second ends 10, 14. The line along which the second end 14 is aligned is slanted relative to the line of first end 10, so that when the platform 8 is viewed from above (in its deployed position, as shown in FIG. 1), it defines a generally trapezoidal shape, for example having a shape similar to the cross-section of a wedge. In this first embodiment, the angle between the first and second ends is about 10 degrees. The platform has a length that varies with the position across the width of the platform from a shortest length of about 1.65 m up to a longest length of about 2.0 m. The width of the platform 8 is about 1.9 m. The platform has a thickness of about 50 mm and is made from aerospace-grade lightweight Aluminium alloy, but could equally be made from composite material or combination thereof.

The platform 8 is moveable between a deployed position and a stowed position in which the cargo hold door may be closed over the opening 4. FIG. 1 shows the platform 8 in its deployed position in which it functions as an access platform for the aircraft 2, enabling the cargo hold in the aircraft 2 to be accessed, for example by a cargo loading ground vehicle. The wedge-shaped nature of the platform eases access to the cargo hold by enabling the cargo loading ground vehicle to load cargo onto the aircraft (or unload cargo from the aircraft) with the longitudinal axis of the ground vehicle inclined relative to the normal axis of the door opening 4, thereby providing better clearances from parts of the aircraft or other equipment that lie rearwards of the door opening 4 (in the configuration shown in FIG. 1).

When in its deployed position, as shown in FIG. 1, the platform 8 is supported by an hydraulic or electrical actuator, chains or other linkage means (not shown) that are connected to the platform on its sides at positions near the second end 14, the actuators or chains also being connected to the aircraft structure at positions inside the door opening 4 and vertically above the level of the platform. The chains or actuators have a length such that when fully deployed the platform 8 lies substantially horizontally. The platform 8 thus includes an attachment mechanism that attaches the platform 8 to the aircraft 2, in this embodiment the attachment mechanism being in the form of hinges and the chains or actuators described above.

On the platform's upper surface, which extends between the first and second ends 10, 14, there are mounted several rolling bearings, in this first embodiment provided by a ball mat. These rolling bearings act as a support surface for supporting and conveying cargo loads across the platform between the first and second ends. The ballmat may also be used to translate the cargo as required.

The platform 8, in its stowed position, folds up behind the cargo hold door. To deploy the platform 8, it is necessary to open the cargo hold door by rotating the door about its hinge connection (rotation about an axis generally parallel to the longitudinal axis of the aircraft) and then to rotate the platform 8 downwards from its folded stowed position to the unfolded and horizontal deployed position (as shown in FIG. 1). In this embodiment, the position and configuration of the hinges of the platform 8 result in the axis of rotation of the platform 8 being fixed and being substantially aligned with the first end 10 of the platform.

When cargo is to be loaded onto the aircraft, the platform 8 is deployed (to the position shown in FIG. 1) and a ground vehicle is aligned with the second end 14 of the platform 8. Items of cargo are then moved from the ground vehicle via the supporting surface defined by the platform into the cargo hold of the aircraft. The angled nature of the second end 14 of the platform 8 allows the ground vehicle to effectively abut the aircraft at an angle to the perpendicular. This provides better clearance from the engine on the same side of the aircraft as the ground vehicle and thus reduces the risk or a vehicle or any part thereafter clashing with any part of the aircraft structure.

Figure 2A:
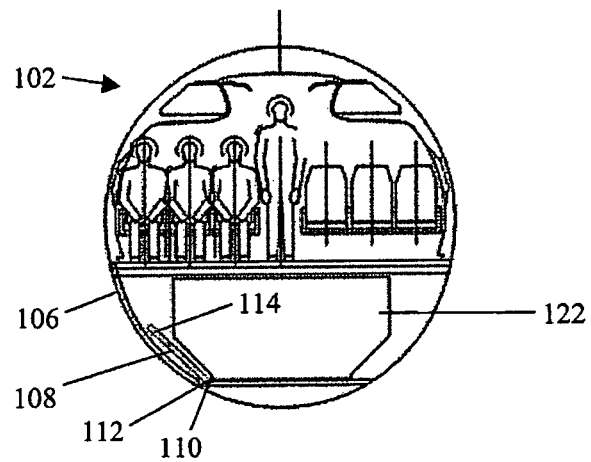
FIGS. 2a to 2d show a method of unloading containers from an aircraft in accordance with a second embodiment of the invention.
Figure 2B:
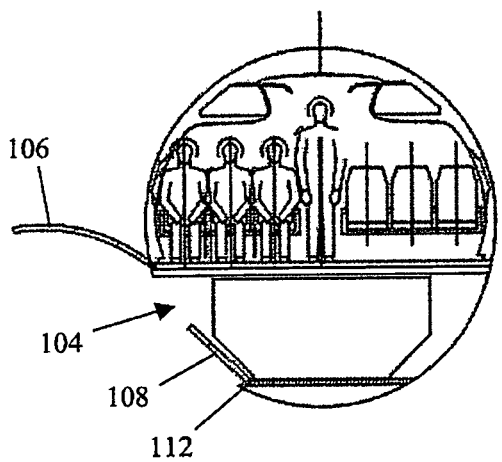
Figure 2C:
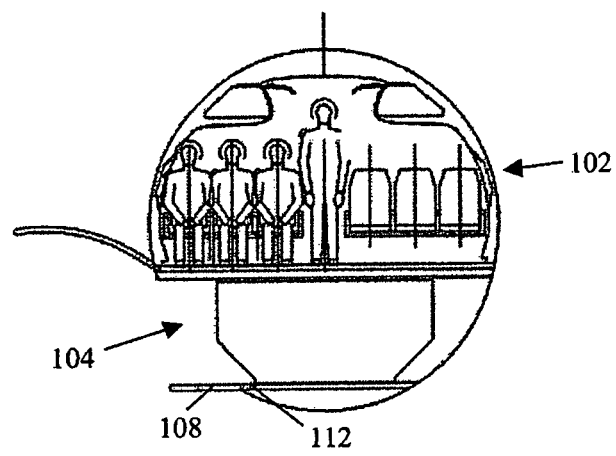

FIGS. 2a to 2d show a method of unloading a container from an aircraft according to a second embodiment of the present invention, each of the Figures showing a cross-section of the fuselage of the aircraft 102 at successive steps in the method. The aircraft 102 includes a platform 108. The aircraft 102 and platform 108 are substantially identical to the aircraft and platform described above in relation to the first embodiment. The platform thus has a generally trapezoidal shape when viewed in plan (it being shown side on in FIGS. 2a to 2d and has a first end 110 which is generally parallel to the longitudinal axis of the plane and a second end 114 that is inclined at an angle of about 10 degrees to the longitudinal axis when viewed from above (the second end lying on a notional straight line that crosses the longitudinal axis of the aircraft at a position forward of the second end 114). The attachment mechanism for attaching the platform 108 to the aircraft 102 is also identical to that of the first embodiment described above, and comprises hinges 112, chains (not shown) and actuators (not shown). Thus, the platform 108 is rotatable from a stowed position (as shown in FIG. 2a) to a deployed position (as shown in FIG. 2c), by means of rotational movement about an axis parallel to the longitudinal axis of the aircraft when viewed from above.

The steps of the method of the second embodiment will now be described in sequence. FIG. 2a shows the cargo hold door 106 closing over the opening with which the platform 108 is associated. A container 122 is shown in the cargo hold. The platform is in its stowed and folded position extending upwards from its hinged first end 110 at an angle of about 45 degrees to the horizontal or other angle depending on the particular interior geometry of the aircraft hold. The cargo hold door 106 is opened by rotating the door about its upper end to the position shown in FIG. 2b. The platform 108 is then lowered out of the opening to the position shown in FIG. 2c, by rotating the platform about its hinges 112 to the position shown in FIG. 2c. A cargo loading vehicle is driven up to the platform 108. The cargo loading vehicle in this embodiment is in the form of a standard pallet/container loader (not shown in FIG. 2c) and comprises two loading platforms (located fore and aft) mounted on independent scissor jacks able to raise pallets/containers up to the level of the aircraft floor line or down to the level of a pallet/container transporter. (A pallet/container transporter by comparison is a ground vehicle used to convey several pallets/containers simultaneously thereby enabling pallets/containers to be chauffeured to and from the pallet/container loader). The pallet/container loader platforms incorporate electrically powered rollers that rotate to assist container transfer from aircraft to the pallet/container loader. The pallet/container loader may be aligned with the second end 114 of the platform 108 by means of vertical markers located on the aircraft and corresponding vertical markers mounted on the pallet/container loader. The driver of the pallet/container loader keeps the markers in line with one another while driving up to the platform 108. The pallet/container loader platforms are therefore angled when viewed from above at about 10 degrees to the longitudinal axis of the aircraft 102.

Figure 2D:
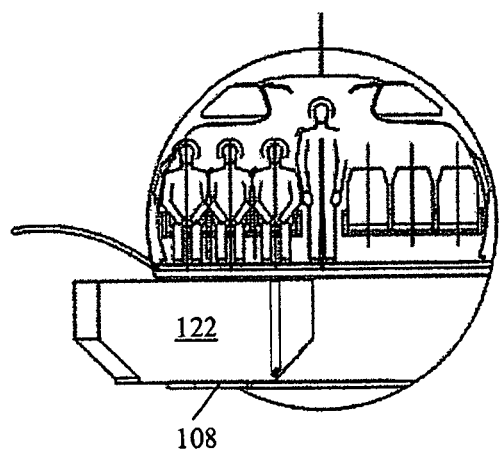

The container 108 is then moved out of the cargo hold through the door opening 104 by means of powered rollers in the cargo hold. The rollers include conical rollers which allow the container to rotate as it is moved out of the cargo hold. Thus, the movement of the container across the platform 108 is substantially perpendicular to the line of the second end 114 of the platform 108. FIG. 2d shows the container 122 as it cross the platform 108. Thus as viewed from above, the container 122 moves out of the door opening 104 so that the front end of the container is angled when viewed from above at about 10 degrees to the longitudinal axis of the aircraft 102. The container 122 continues being moved across the platform assisted by powered rollers both in the cargo hold and on the pallet/container loader platforms, until it is fully loaded onto the pallet/container loader. Further containers may of course be unloaded in a similar manner.

Figure 3A:
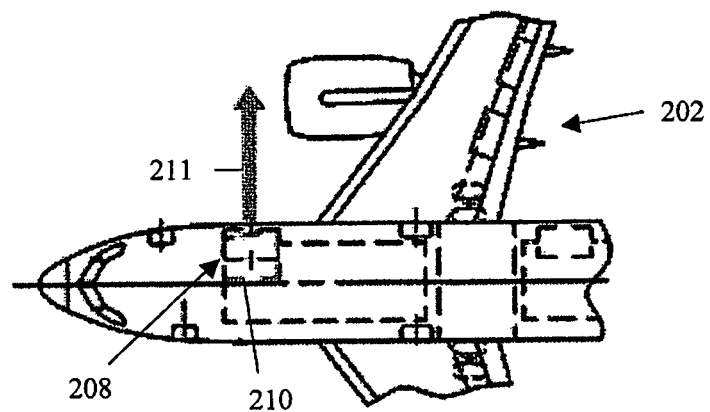
FIGS. 3a to 3d show a method of loading containers onto an aircraft in accordance with a third embodiment of the invention.
Figure 3B:
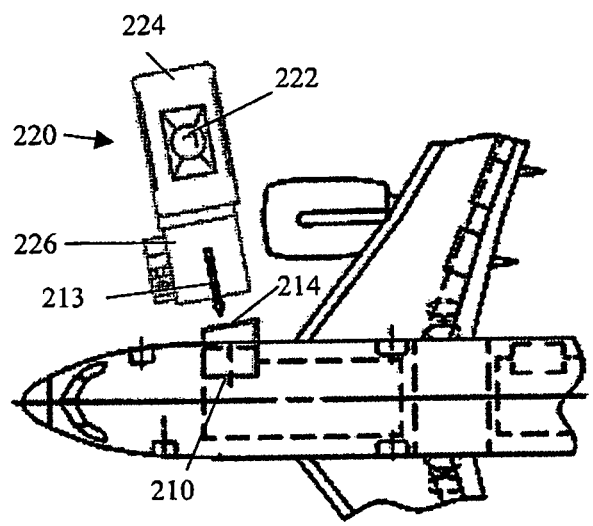

FIGS. 3a to 3d show a method of loading an aircraft according to a third embodiment of the present invention. The aircraft 202 includes a platform 208, having a generally trapezoidal shape when viewed in plan. Thus, the platform 208 has a first end 210 which is generally parallel to the longitudinal axis of the plane and a second end 214 that is inclined at an angle of about 15 degrees to the longitudinal axis when viewed from above (the second end lying on a notional straight line that crosses the longitudinal axis of the aircraft at a position forward of the second end 214). In this embodiment, the attachment mechanism for attaching the platform 208 to the aircraft 202 is in the form of sliding runners with associated bearings that allow the platform 208 to slide from a stowed position (as shown in FIG. 3a) to a deployed position (as shown in FIG. 3b), by means of translational movement in a direction substantially perpendicular to the longitudinal axis of the aircraft when viewed from above. The platform thus is stored in a horizontal position (not shown). It will be seen, from FIG. 3a, that the direction in which the door opening faces is parallel with the direction in which the platform slides (both directions being represented by the arrow 211). In this embodiment the platform has a thickness of about 40 mm, a width of about 1.7 m and a length that ranges from 1.35 m to 1.8 m.

The steps of the method of the third embodiment will now be described in sequence. First, the door closing over the opening with which the platform 208 is associated is opened (the door not being shown in FIGS. 3a to 3d). The platform 208 is then slid out through the opening to the position shown in FIG. 3b. A cargo loading vehicle is driven up to the platform 208. The cargo loading vehicle is identical to the one described above in relation to the second embodiment. FIG. 3b shows the pallet/container loader 220, with a container 222 mounted on the aft platform 224. The pallet/container loader 220 is aligned with the platform 208 by means of vertical markers located on the aircraft and corresponding vertical markers mounted on the pallet/container loader.

Figure 3C:
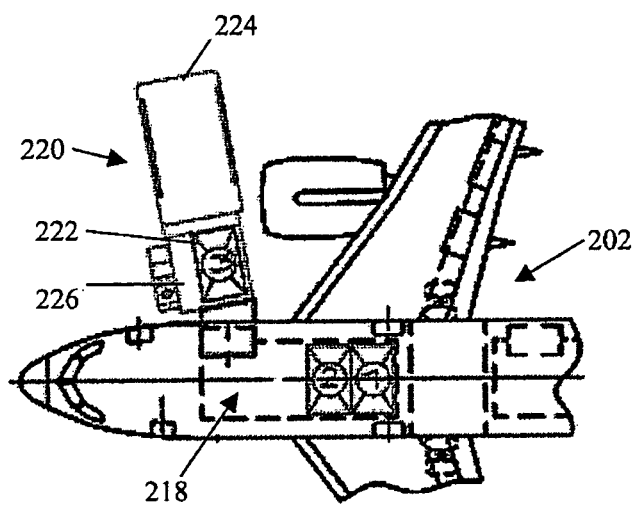

The container 222 is then moved from the aft platform 224 to the fore platform 226 of the pallet/container loader by means of the electrically driven rollers on the loader, so that the container 222 moves to the position shown by FIG. 3c. In FIG. 3c the aft platform 224 and the fore platform 226 are both in a raised position with the fore platform 226 being at a vertical level in line with the aircraft floor and the level of the platform 208. The aft platform 224 is loaded from a pallet/container transporter when in a lowered position and the fore platform 226 is able to load cargo onto an aircraft when in a raised position. For pallets/containers to be moved from one platform to the other, one of the aft and fore platforms 224, 226 needs to be moved to a vertical position that is level with the other. In this embodiment, the aft platform 224 is raised to the height of the fore platform 226.

Figure 3D:
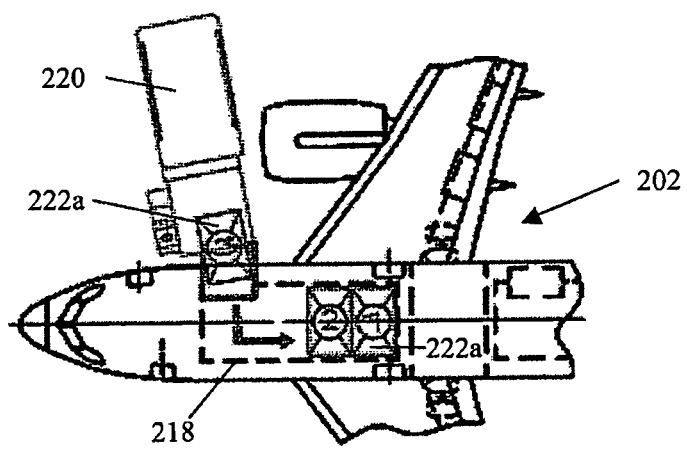

With reference to FIG. 3d, the container 222 is then slid from the fore platform 226 of the pallet/container loader 220 via the platform 208 into the cargo hold 218 of the aircraft 202. The platform 208 supports the weight of the container from beneath as the container is moved from the cargo loader 220 to the aircraft 210. The platform 208 is fitted with rolling bearings, in this embodiment in the form of conical rollers and ball mats, which assist in the support and sliding of the container across the platform 208. The ball mats reduce friction forces and the conical rollers impart rotational movement to the container 222 about a vertical axis, thereby rotating the container 222 towards the orientation of the other containers 222a already loaded in the cargo hold 218. It will be seen from FIGS. 3c and 3d that the other containers 222a are aligned with the longitudinal axis of the aircraft 202. Once the container 222 being loaded onto the aircraft 202 is fully within the cargo hold 218 and aligned with the longitudinal axis of the aircraft 202, the container 222 is then slid along rollers within the cargo hold 218 in a direction parallel to the longitudinal axis of the aircraft so that the newly loaded container 222 is moved up to and against the other containers 222a in the cargo hold 218. Each container 222, 222a is locked into position by means of end stops and container lock assemblies in a manner that is standard in the art.

The conical rollers on the platform and inside the cargo hold therefore act as a turning device, which turns the container 222 from the orientation in which the container is delivered onto the aircraft to a square-on position, in which the outline of the container is aligned with the direction of the longitudinal axis, which is also the direction in which the containers are moved along the cargo hold 218.

Further containers may be loaded onto the aircraft from the pallet/container loader 220. Each such further container is transferred from a pallet/container transporter (not shown) to the pallet/container loader 220 by loading the aft platform 224 of the pallet/container loader 220. The empty aft platform is lowered to receive a container from the pallet/container transporter and then raised to transfer the container to the fore platform 226. The step of loading the aft platform with a new container may be performed at the same time as moving a container from the fore platform into the cargo hold via the platform. By repeating the steps of the method of the third embodiment as described above the requisite number of containers may be loaded into the cargo hold.

With reference to FIG. 3b, the first end 210 of the platform 208 (the end inside the aircraft 202 as shown in FIG. 3b) lies on a notional line that is substantially parallel to the longitudinal axis of the aircraft 202. In other words, the angle defined between the longitudinal axis and the direction in which the first end 210 extends (including when the platform is deployed) is about 0 degrees. The second end 214 of the platform (the end outside the aircraft 202 as shown in FIG. 3b) however lies on a notional line that is at an angle of about 15 degrees to the longitudinal axis, when the platform is deployed and the aircraft is viewed in plan. It will be seen from FIG. 3b that the direction in which the container 222 is moved through the door opening is represented by the arrow 213. It will be observed that the direction of the arrow 213 is not parallel to the direction 211 in which the door opening faces (see arrow 211 shown in FIG. 3a). The directions 211, 213 are inclined relative to each other by an angle of about 15 degrees.

Figure 4A:
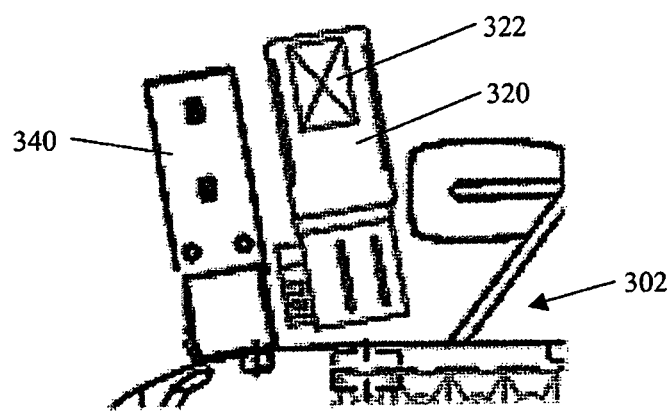
FIG. 4a is a partial cross-section of an aircraft shown in plan, the aircraft being in accordance with a fourth embodiment of the invention.
Figure 4B:
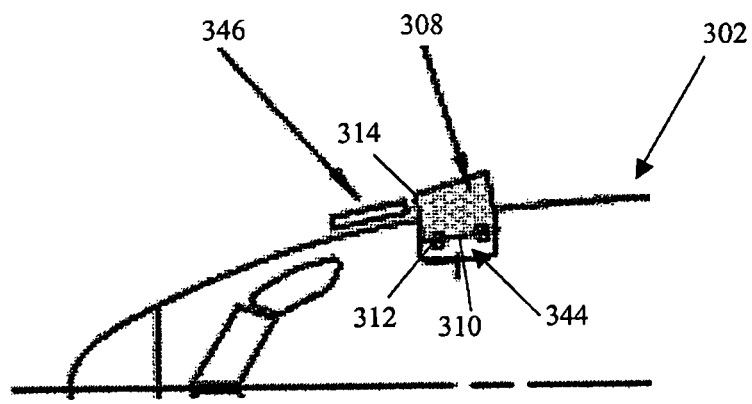
FIG. 4b is an enlarged partial cross-section of the aircraft shown in FIG. 4a showing a platform in a deployed position
Figure 4C:
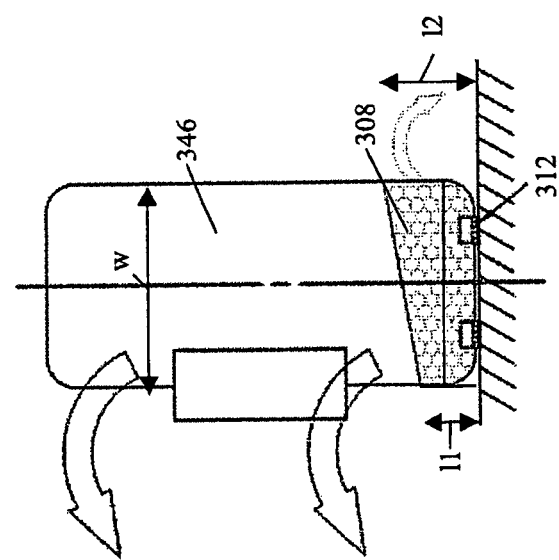
FIG. 4c shows a view from inside the aircraft of the fourth embodiment illustrating the platform in its stowed position.

FIGS. 4a to 4c show a fourth embodiment of the present invention. It is very common for the passenger door to be used to load and unload catering supplies. This door can, for some aircraft be very close, in the longitudinal direction, to the cargo hold door. Thus, if containers and/or pallets are loaded onto or unloaded from a cargo loader that is angled to the perpendicular it may then be beneficial also to angle the catering supplies ground vehicle in a similar manner to avoid mechanical clashes. FIG. 4a shows such a configuration in plan view. Thus, a cargo loader 320 carrying a container 322 is shown angled to the perpendicular by about 10 degrees. A catering vehicle 340 is shown positioned alongside the cargo loader 320 and is similarly angled to the perpendicular. Freight, for example, in the form of pallets or containers are loaded onto the aircraft (or unloaded from the aircraft) via the cargo hold door opening in a manner substantially identically to that described above in relation to the third embodiment. Catering supplies are loaded onto the aircraft via a passenger door opening 344 having an associated door 346 for opening and closing the opening 344. As shown in greater detail in FIG. 4b, there is also associated with the opening 344, a platform 308 for supporting catering supplies as they are loaded onto or off the aircraft 302. The platform 308 in the embodiment illustrated by FIG. 4b is constituted by a component which is separate from the passenger door structure 346. The platform 308 does not therefore form any substantial part of the door 346 and may be simply located proximate the door in the stowed position. FIG. 4c shows the platform in its stowed position. As can be seen from both FIGS. 4b and 4c, the platform is trapezoidal in shape.

As can be seen in FIG. 4b, the platform 308 has a first end 310 that is hinged to the passenger door opening 344 via hinges 312. The platform 308 could be hinged at a location on or near the cabin floor proximate the lower part of the door. When viewed from above (as shown in FIG. 4b), this first end 310 lies on a generally straight line, which is generally aligned with the outer line of the fuselage of the aircraft 302 in the region of the door opening 344. Opposite the first end 310 of the platform 308 is a second end 314, which lies on a generally straight line which is angled relative to the line of first end 10, when viewed from above, at an angle of about 10 degrees. The platform has a length that varies with the position across the width of the platform from a shortest length L1 of about 180 mm up to a longest length L2 of about 300 mm. The width W of the platform 8 is about 0.7 m and its thickness is about 30 mm. The platform for conveying catering supplies is therefore much smaller than the platform for conveying pallets and containers and is not therefore, at least in this embodiment, interchangeable with the platform for use with the cargo hold door opening, which will in many embodiments need to have a width greater than 1 m.

Figure 5:
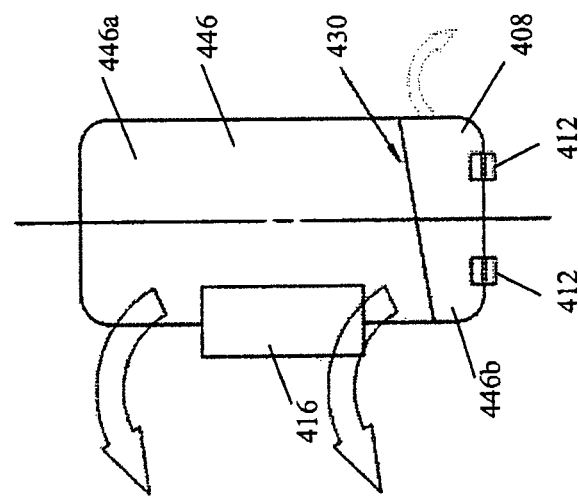
FIG. 5 shows a view from inside an aircraft according to a fifth embodiment of the invention.

FIG. 5 illustrates a fifth embodiment of the present invention, similar to the fourth, apart from differences to the arrangement of the platform associated with the passenger door. In this fifth embodiment, the platform 408 forms part of the door 446. Thus, the door is split in two on an angle represented by the line 430 shown in FIG. 5. Thus, the door has a top part 446a that is mounted on the door opening by means of a conventional door hinge mechanism 416, which allows the top part 446a of the door to swing about a vertical axis. The door also has a bottom part 446b which is mounted for rotation about hinges 412 so that the bottom part can fold down to form a horizontal platform. The bottom half 446b of the door which forms the platform 408 is provided with an additional attachment mechanism (not shown) in the form of support arms which extend underneath the platform 408 when deployed to provide the platform 408 with additional structural support. These may not be necessary depending on the specific construction adopted.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In the above described embodiments, the platform includes an attachment mechanism for attaching the platform to the aircraft. In a sixth embodiment not illustrated by the accompanying drawings, the platform is attached, by means of an attachment mechanism, to a cargo loader. The attachment of the platform could, for example, be achieved by means of attaching the second end of the platform to the cargo loader, so that the orientation of the platform relative to the cargo loader and the aircraft is substantially identical to that as illustrated by the accompanying figures. Alternatively, the first end of the platform could be attached to the cargo loader so that the second end is presented to the aircraft when loading or unloading containers. (In the context of this sixth embodiment and this variation, it will be understood that the first end of the platform is that end which when the platform is viewed in plan is perpendicular to the sides that join the first and second ends, whereas the second end is inclined relative to the perpendicular.) In the case where the platform is attached to a vehicle other than an aircraft, the platform may be permanently mounted to facilitate loading and unloading. Thus, the platform need not be moveable between stowed and deployed positions and may instead be fixed in a deployed position. In such a case, there may be no need for any attachment mechanism other than a simple mechanical or structural attachment. For example, the platform could simply be welded to a cargo loader and/or could take the form of a cantilever structure.

It will be appreciated that the principles illustrated by the exemplary embodiments of the invention may be utilised in the loading of or the unloading of an aircraft.

Loaded pallets, containers or other large items of cargo may be conveyed between the aircraft and ground vehicles by means of embodiments of the invention. In the context of the present invention, an item of cargo may be considered as being "large" if it has a length or width of greater than 1000 mm (and preferably a width of greater than 800 mm and a length of greater than 800 mm) and a mass of greater than 100 Kg (preferably a mass of greater than 250 Kg). Loaded containers or loaded pallets typically have a mass of greater than 1000 Kg and are therefore considered to be examples of large items of cargo. The platform as described above may of course be scaled up for use on larger aircraft and/or for use in relation to larger items of cargo. For example, netted pallets used on twin aisle aircraft may have a base measuring 2.4 m×3.1 m, which when loaded with cargo may have a volume greater than 10 cubic meters and a mass of up to about 5 tonnes. In such a case, the cargo door opening may have a width of about 2.7 m with the platform having a similarly dimensioned width.

The platform may be used in relation to a passenger door opening only on an aircraft. The platform may be used to convey passengers as well as or instead of freight. For the avoidance of doubt, individual items of passenger luggage, of the sort that may be conveyed by conveyor belt directly into the hold of an aircraft, are not to be considered as large items of cargo.

The conical rollers which act to turn the container may be replaced by any suitable turning device. The turning device may for example be in the form of a rotating turntable positioned in the cargo hold.

The cargo hold door and the associated platform may be provided as separate components as shown in the attached drawings. Alternatively, the platform could form at least part of the door in a manner similar to that shown in FIG. 5 in relation to the platform associated with the passenger door of the fifth embodiment. It will be appreciated that the upper surface of the platform when deployed will need to be substantially planar, but that the lower surface may have a non-planar shape that when the platform is stowed matches the contours of the outer surface of the aircraft that surrounds the cargo door opening.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft including a door opening for the conveying of passengers or cargo to or from the aircraft and an access platform, said platform mounted on said aircraft for movement between stowed and deployed positions and comprising:
   a first end;
   a second end; and
   a support surface extending between said first and second ends, wherein the door opening is proximate to an aircraft structure that restricts access to the door opening, wherein the second end of said access platform, when in said deployed position and viewed in plan, is non-parallel to said door opening.

2. An aircraft according to claim 1, wherein the first end of the access platform is attached to the aircraft in the region of the door opening.

3. An aircraft according to claim 1, wherein the aircraft includes a door associated with the door opening and the access platform forms part of the door.

4. An aircraft according to claim 1, wherein the aircraft includes a door associated with the door opening and the access platform is separate from the door.

5. An aircraft according to claim 1, wherein
   the aircraft has a longitudinal axis,
   a first angle has a sign and is defined between the longitudinal axis and the direction in which the first end extends when the access platform is deployed, when the aircraft is viewed in plan, and
   a second angle has a sign and is defined between the longitudinal axis and the direction in which the second end extends when the access platform is deployed, when the aircraft is viewed in plan, wherein the magnitude of the second angle is greater than the magnitude of the first angle, and either (a) the first angle is zero or (b) the first angle is non-zero and the second angle has the same sign as the first angle.

6. An aircraft according to claim 5, wherein the magnitude of the second angle is between 5 and 20 degrees.

7. An aircraft according to claim 1, wherein
   the door opening leads to a cargo hold of the aircraft,
   the cargo hold includes a cargo conveying system for translating cargo in a first direction within the cargo hold,
   the platform is arranged to deliver cargo in an preset orientation into the cargo hold, and
   the cargo hold includes a turning device for turning the cargo from the preset orientation in which the cargo is delivered into the hold to a different orientation that is aligned with the first direction.

8. An aircraft according to claim 1, wherein the access platform is adapted to enable an item of cargo to be loaded onto the aircraft so that the movement of the item through the door opening is in a direction which when viewed in plan is not parallel to the direction in which the door opening faces.

9. An aircraft according to claim 1, wherein the first and second ends of the access platform when viewed in plan are non-parallel.

10. An aircraft according to claim 1, wherein
    the access platform is attached to the aircraft using an attachment mechanism and the attachment mechanism is arranged to facilitate translational movement of the access platform.

11. An aircraft according to claim 1, wherein
the access platform is attached to the aircraft using an attachment mechanism and
the attachment mechanism is arranged to facilitate rotational movement of the access platform.

12. An aircraft according to claim 1, wherein the access platform is a cargo platform for use in conveying cargo into the cargo hold of the aircraft.

13. An aircraft according to claim 1, wherein the platform includes:
a plurality of rolling bearings for supporting and conveying loads across the platform from one of the first and second ends to the other and,
the roller bearings are arranged to rotate about an axis parallel to the second end.

14. An aircraft according to claim 1, wherein the platform includes:
a plurality of rolling bearings for supporting and conveying loads across the platform from one of the first and second ends to the other and,
at least a portion of the roller bearings are conical rollers and allow said load to rotate during movement out of said aircraft.

15. An aircraft including a door opening for the conveying of cargo to or from a cargo hold of the aircraft and an access platform, said platform comprising a portion of said aircraft and configured for movement between stowed and deployed positions, said platform comprising:
a first end;
a second end; and
a support surface extending between said first and second ends, wherein, when in said deployed position and viewed in plan, the first end of said platform is parallel to said door opening and the second end of said platform is non-parallel to said door opening.

16. An aircraft according to claim 15, wherein the platform includes:
a plurality of rolling bearings for supporting and conveying loads across the platform from one of the first and second ends to the other and,
at least a portion of the roller bearings are conical rollers and allow said load to rotate during movement into and out of said cargo hold.

* * * * *